United States Patent [19]
Lubker, II et al.

[11] Patent Number: 6,067,770
[45] Date of Patent: May 30, 2000

[54] METHODS FOR USING A FOAM CONDENSATION BOARD SYSTEM

[75] Inventors: John W. Lubker, II, Roswell; Edward C. LeDuc, Marietta, both of Ga.

[73] Assignee: Pactiv Corporation, Lake Forest, Ill.

[21] Appl. No.: 09/144,597

[22] Filed: Aug. 31, 1998

[51] Int. Cl.$^7$ ...................................................... E04B 1/64
[52] U.S. Cl. ...................... 52/741.4; 52/267; 52/746.11
[58] Field of Search ............................. 52/408, 267, 410, 52/506.01, 506.05, 741.3, 741.4, 746.1, 746.11, 747.1

[56] References Cited

U.S. PATENT DOCUMENTS

| | | |
|---|---|---|
| 4,415,392 | 11/1983 | Komori . |
| 4,476,183 | 10/1984 | Holtrop et al. .......................... 428/286 |
| 4,852,314 | 8/1989 | Moore, Jr. ................................. 52/199 |
| 5,565,497 | 10/1996 | Godbey et al. .......................... 521/131 |
| 5,695,870 | 12/1997 | Kelch et al. . |

OTHER PUBLICATIONS

Brochure for "AMOCOR®–PB6 Roofing Recovery Board" By Tenneco Building Products, Dated Apr. 1998, p. 2.
Brochure for "AMOCOR® PlyGOOD® New Construction Sheathing" By Tenneco Building Products, Dated Feb. 1998, p. 2.
Brochure for "AMOCOR®–PB4 Waterproofing Protection Board" By Tenneco Building Products, Dated Dec. 1997, p. 2.
Brochure for "AMOCOR® Residing Underlayment" By Tenneco Building Products, No. Date, p. 4.
Brochure for "AMOCOR® PLYFOLD Residing Underlayment . . . " By Tenneco Building Products, No Date, p. 2.
Brochure for "Celotex® Super Tuff–R® Insulating Sheathing Tough To Hurt" By Celotex Corporation, Dated Apr. 1998, p. 4.
Brochure for "Value–R™ Insulation Board" By The Celotex Corporation, Dated Jun. 1996, p. 8.
Brochure for "Thermax® Sheathing" By The Celotex Corporation, Dated Jan. 1996, p. 12.
Brochure for "Carpenter Sheathing" By Carpenter Insulation Company, No Date, p. 2.

(List continued on next page.)

*Primary Examiner*—Michael Safavi
*Attorney, Agent, or Firm*—Jenkens & Gilchrist

[57] ABSTRACT

A method for using a foam condensation board system in a building according to one embodiment comprises the steps of: providing a foam condensation board system, providing a building having a roof and a roof supporting structure, and installing the foam condensation board system to the roof supporting structure. The foam condensation board system comprises at least a first layer, a second layer, a third layer, a fourth layer, and a fifth layer. The first layer is made from a material selected from the group consisting of alkenyl aromatic polymers, polyolefins, polyethylene terephthalate, polyesters, and combinations thereof. The second and fourth layers are independently made from a material selected from the group consisting of alkenyl aromatic polymers, polyolefins, polyethylene terephthalate, adhesives, and combinations thereof. The third layer is made from a material selected from the group consisting of alkenyl aromatic polymers, polyethylene terephthalate, and combinations thereof. The fifth layer is made from a material selected from the group consisting of alkenyl aromatic polymers, polyolefins, polyethylene terephthalate, polyesters, and combinations thereof. At least one layer is a foam layer. The second layer is located between the first and third layers. The fourth layer is located between the third and fifth layers. A method of using a foam condensation board system in a building according to another embodiment comprises the steps of: providing a foam condensation board system, providing a building having a side wall and a side wall supporting structure, and installing the foam condensation board system to the side wall supporting structure.

32 Claims, 7 Drawing Sheets

OTHER PUBLICATIONS

Brochure for "Styrofoil® High . . . Carpenter Polyisocyanurate . . ." By Carpenter Insulation Company, No Date, p. 2.

Brochure for "Thermax® Heavy Duty (HD) (TF604) Insulation/Finish Board" By The Celotex Corporation, Dated Aug. 1995, p. 4.

Brochure for "Thermax® Heavy Duty Plus (HDP) (TF665) Insulation/Finish Board" By The Celotex Corporation, Dated Dec. 1995. p. 4.

Brochure for "Thermax® AG–THERM™ Insulation/Finish Board" By The Celotex Corporation, Dated Dec. 1996, p. 8.

Brochure for "Tuff–R® Insulating Sheathing" By The Celotex Corporation, Dated Aug. 1991, p. 16.

Brochure for "Tuff–R® Insulating Sheathing (Nonreflective)" By The Celotex Corporation, No Date, p. 2.

Brochure for "NRG Barriers Energy–Efficient Building Products" By NRG Barriers, No Date, p. 8.

Brochure for "Reflectix™ Insulation—Installation Guide & Ideas" By Reflectix™, Inc., Dated Dec. 1994, p. 9.

Brochure for "Astro–Foil™ Reflective Insulation" By Astro–Valcour, Incorporated, Dated 1990 p. 6.

Brochure for "Astro–Foil™ Reflective Insulation" By Innovative Energy, Inc., Dated May 1996, p. 4.

Brochure for "Astro–Foil™ and Astro–E Installation Guidelines" By Astro–Valcour, Inc., Dated Dec. 1989, p. 6.

Brochure for "Astro–Foil™ For the H.V.A.C. Industry" By Astro Foil™ Reflective Insulation, No Date, p. 2.

Brochure for "Low–E Insulation" By ESP, Inc., Dated 1996, p. 6.

Brochure for "Low–E Insulation Data & Insulation Guidelines" By E.S.P., Inc., No Date, p. 28.

Brochure for "Low–E™ Insulation" By Environmentally Safe Products Inc., No Date, p. 6.

Brochure for "ASTRO–E™ Reflective Insulating Material" By Innovative Energy, Inc., No Date, p. 1.

Brochure for "P–2000 Reflect–Sulation 5/8"–4'x 8' Premium Boards" By Now your R Stands for 'R'eal 'R'esults . . . , Date Jun. 96, p. 4.

Brochure for "Ply–Foil Reflective Insulation Specification & Application Guide for Post Frame and Metal Building Construction" By Ply–Foil Incorporated, No Date, p. 12.

Brochure for "Flexfoil™ Reflective Insulation" By Polyair® Insulation, No Date, p. 2.

Brochure for "Flexfoil™ Low–E Reflective Insulation" By Polyair® Insulation, No Date, p. 9.

Brochure for "The Insulator™" By Unlimited Quality Products, Feb. 1997, p. 7.

Brochure for "Stomp It. Bash It. Bend It. Nail It. Soak It. Freeze It" By Dow®, No Date, p. 2.

Brochure for "Results For Farmers Looking For Higher Yields On Their Investments. Styrofoam AG Board Insulation." By Dow U.S.A., No Date, P. 8.

Brochure for "Sheathing. With a new extra durable face. Takes On Five Tough Tests." By The Dow Chemical Company, No Date, p. 2.

Brochure for "The Ad–Building Program For Re–Siders" By The Dow Chemical Company, No Date, p. 7.

Brochure for "PROPINK™ Super Tough Insulating Sheathing" By Owens Corning, Dated Mar., 1997, p. 2.

Brochure for "Fanfold—Extruded Polystyrene Insulation for Residing and Other Applications" By Owens Corning, Dated Jun. 1996, p. 2.

Brochure for "Underlayment board Fan–Fold Extruded Polystyrene Insulation Panels for Residing Application" by UCI UC Industries, Dated Jul. 1991, p. 2.

Brochure for "Idenenberg & Co. Mills Supplied—Building America For Over Fifty Years" By Denny Building Products, No Date, p. 8.

Brochure for "Dennyfold. An important layer of protection for your home" By Carpenter Insulation Company, No Date, p. 2.

Brochure for "Dennyfold Underlayment Board—An important layer of protection for your home" By Denny Sales Corporation, No Date, p. 2.

Brochure for "Outfox Dry Rot With Fome–Cor® . . . It Breathes" By Monsanto Company, Dated 1990, p. 1.

Brochure for "How to make four inches of fiberglass insulate better than six" By Monsanto Company, Dated 1982, p. 1.

Brochure for "Homeowners' Underlayment Assurance Policy" By Monsanto Company, Dated 1991, p. 2.

Brochure for "How Fome Cor® Foils The Competition" By Monsanto Company, Dated 1990, p. 2.

Brochure for "Fome–Cor® Has The Secret That Minimizes Dry Rot" By Monsanto Company, Dated 1989, p. 2.

Brochure for "Underneath it all . . . A hidden difference that saves you money. Fome–Cor® Board" By Monsanto Engineered Products Division, Dated 1984, p. 8.

Brochure for "Weather Barrier Fome–Cor® Board Technical Manual" By Monsanto Engineered Products Division, Dated 1986, p. 21.

Brochure for "Gold Series Insulation Products" By Plymouth Foam Products, No Date, p. 4.

Brochure for "Thermowall Revolutionary New Energy Saving Wall System" By VIPCO, No Date, p. 4.

Brochure for "Thermo Wall Vinyl Siding Installation" By Thermo Wall, No Date, p. 1.

Brochure for "New ThermoWall—The Contoured Foam Underlayment Designed Specifically To Support Vinyl Siding" By Expanded Plastics, Inc., No Date, p. 4.

Brochure for "Dura–Foam®" By Foam Plastics of New England, No Date, p. 8.

Brochure for "INSUL–WRAP®" By Foam Plastics of New England, No Date, p. 2.

Brochure for "INSUL–WRAP™ . . . for contractors who take pride in their work" By Foam Plastics of New England, No Date, p. 2.

Brochure for "INSUL–WRAP" By Foam Plastics of New England, No Date, p. 2.

Brochure for "Perma "R" sheathing is a modified expanded polystyrene insulation" By Perma "R" Products, Inc., No Date, p. 4.

Brochure for Foil Clad (both sides) Polystyrene Sheathing R–Values By Perma "R" Products, Inc., No Date, p. 1.

Brochure for "Winsulfoam Western Insulfoam" By Premier Industries Inc., No Date, p. 2.

Brochure for "Shelterwrap Air Infiltration" By Shelter Enterprises Incorporated, No Date, p. 3.

Brochure for "SheathAll HD—A product of Shelter Enterprises, Inc." By Arco Chemical, No Date, p. 2.

Brochure for "Shelterwrap HD™. The better leveler" By Shelter Enterprises Incorporated, No Date, p. 2.

Brochure for "New Superwrap—Fan fold with Tyvek® Facing" By Shelter Enterprises, Inc., No Date, p. 2.

Brochure for "Shelterforam Snap Vents" By Shelter Enterprises, Inc., No Date, p. 1.

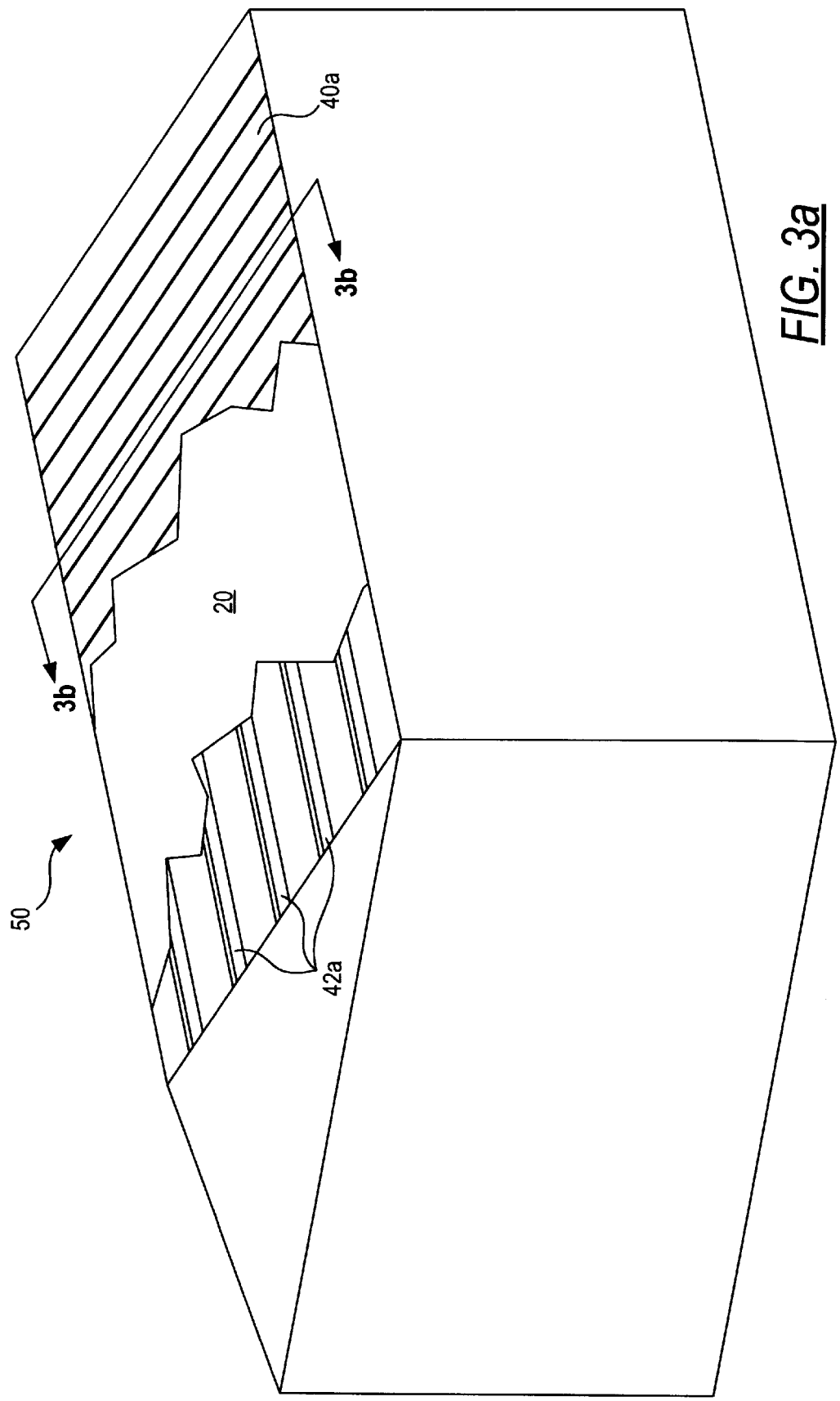

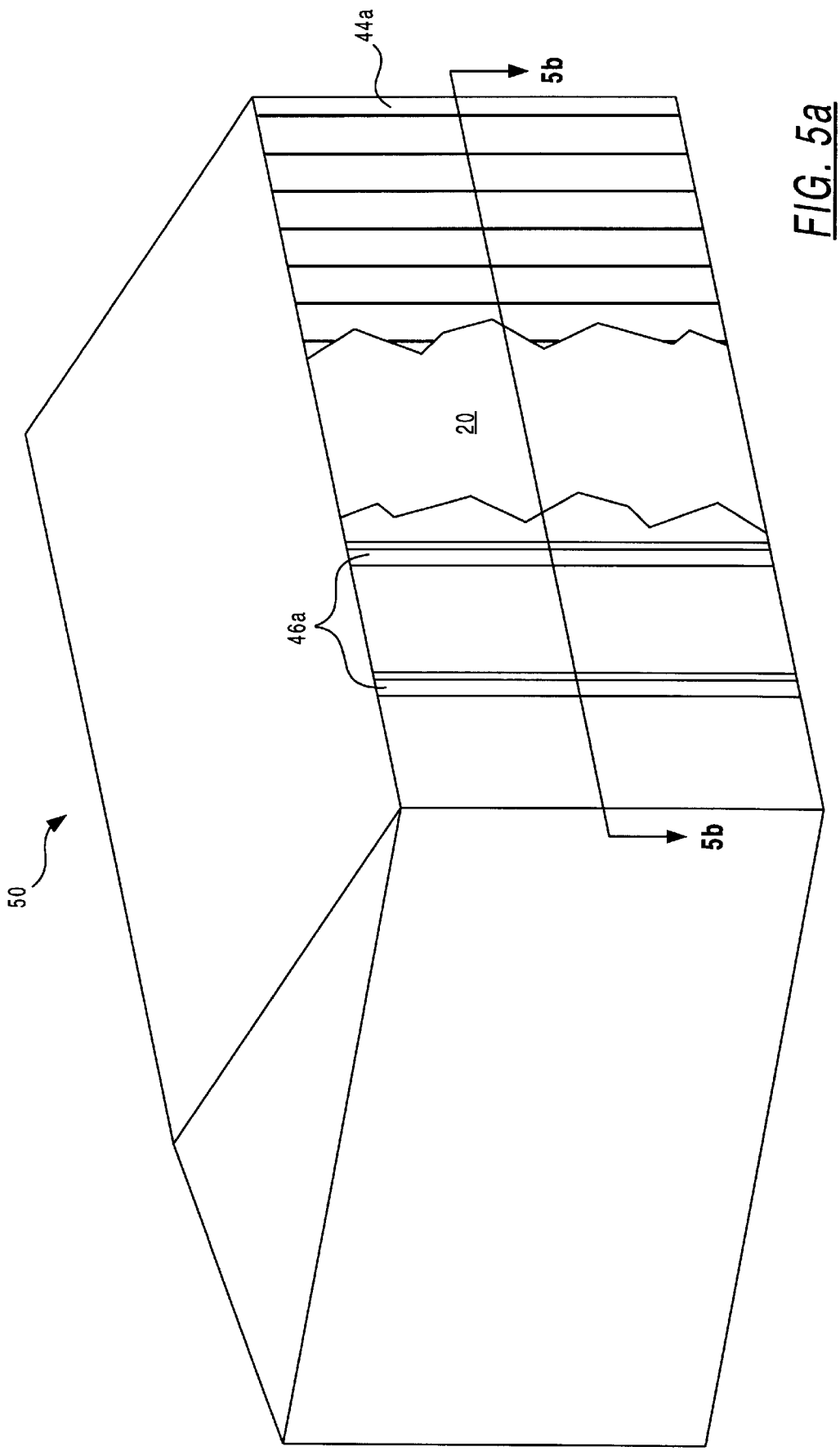

6,067,770

METHODS FOR USING A FOAM CONDENSATION BOARD SYSTEM

FIELD OF THE INVENTION

The present invention is directed to methods for using a foam condensation board system. In particular, the present invention is directed to methods for using a foam condensation board system in post-frame building and metal building construction.

BACKGROUND OF THE INVENTION to save builders money, many low end structures, such as agricultural buildings, are constructed with metal frames having little or no insulation. These low end buildings are often poorly heated and ventilated. As a result, these buildings often experience condensation problems with changes in dew point, causing water droplets to form on their ceilings. These water droplets accumulate, fall onto the buildings' contents, and depending on the stored materials, cause problems ranging from rusting of machinery and equipment to germination of seeds. In addition to the condensation problem, these low end structures often undergo thermal expansions and contractions with changing climactic conditions.

Various materials have been used in these low end structures in trying to eliminate this condensation problem and accommodate the thermal expansions and contractions in these buildings. For example, various types of foil radiant barriers, including radiant barriers having foil layers on both sides, a foil layer on one side only, and a foil layer on one side with a white film layer on the other side have been used. These foil radiant barriers, however, have disadvantages such as tearing easily with thermal expansions and contractions of these buildings, providing inadequate insulation, and being costly. In addition, bubble foil having a central bubble layer and foil on both sides has been used. Bubble foil, however, has disadvantages such as being expensive. Thick boards with facers have also been used. However, these thick boards have disadvantages such as being expensive. Furthermore, three-layered systems having a foam core layer and impact polystyrene facers have been used. These layered systems, however, have disadvantages such as being too fragile to withstand thermal expansions and contractions of these buildings and being produced in a way which is difficult to install (e.g., individual sheets versus fanfolded boards).

Accordingly, a need exists for condensation board systems which are capable of withstanding thermal expansions and contractions of these buildings and providing a generally moisture-free environment.

SUMMARY OF THE INVENTION

A method for using a foam condensation board system in a building according to one embodiment comprises the steps of: providing a foam condensation board system, providing a building having a roof and a roof supporting structure, and to installing the foam condensation board system to the roof supporting structure. The foam condensation board system comprises at least a first layer, a second layer, a third layer, a fourth layer, and a fifth layer. The first layer is made from a material selected from the group consisting of alkenyl aromatic polymers, polyolefins, polyethylene terephthalate, polyesters, and combinations thereof. The second and fourth layers are independently made from a material selected from the group consisting of alkenyl aromatic polymers, polyolefins, polyethylene terephthalate, adhesives, and combinations thereof. The third layer is made from a material selected from the group consisting of alkenyl aromatic polymers, polyethylene terephthalate, and combinations thereof. The fifth layer is made from a material selected from the group consisting of alkenyl aromatic polymers, polyolefins, polyethylene terephthalate, polyesters, and combinations thereof. At least one layer selected from the group consisting of the first layer, the second layer, the third layer, the fourth layer, and the fifth layer is a foam layer. The first layer is located adjacent the second layer. The second layer is located between the first layer and the third layer. The third layer is located between the second layer and the fourth layer. The fourth layer is located between the third layer and the fifth layer.

A method for using a foam condensation board system in a building according to another embodiment comprises the steps of: providing a foam condensation board system, providing a building having a side wall and a side wall supporting structure, and installing the foam condensation board system to the side wall supporting structure.

BRIEF DESCRIPTION OF THE DRAWINGS

Other objects and advantages of the invention will become apparent upon reading the following detailed description and upon reference to the drawings.

FIG. 3a is a perspective view of the foam condensation board system in the present invention according to one method of use in a roofing application;

FIG. 3b is a cross-sectional view of the foam condensation board system in the present invention taken through line 3b—3b of FIG. 3a;

FIG. 4b is a cross-sectional view of the foam condensation board system in the present invention taken through line 4b—4b of FIG. 4a;

FIG. 5a is a perspective view of the foam condensation board system in the present invention according to one method of use in a siding application;

FIG. 5b is a cross-sectional view of the foam condensation board system in the present invention taken through line 5b—5b of FIG. 5a;

FIG. 6b is a cross-sectional view of the foam condensation board system in the present invention taken through line 6b—6b of FIG. 6a.

Figure 1:
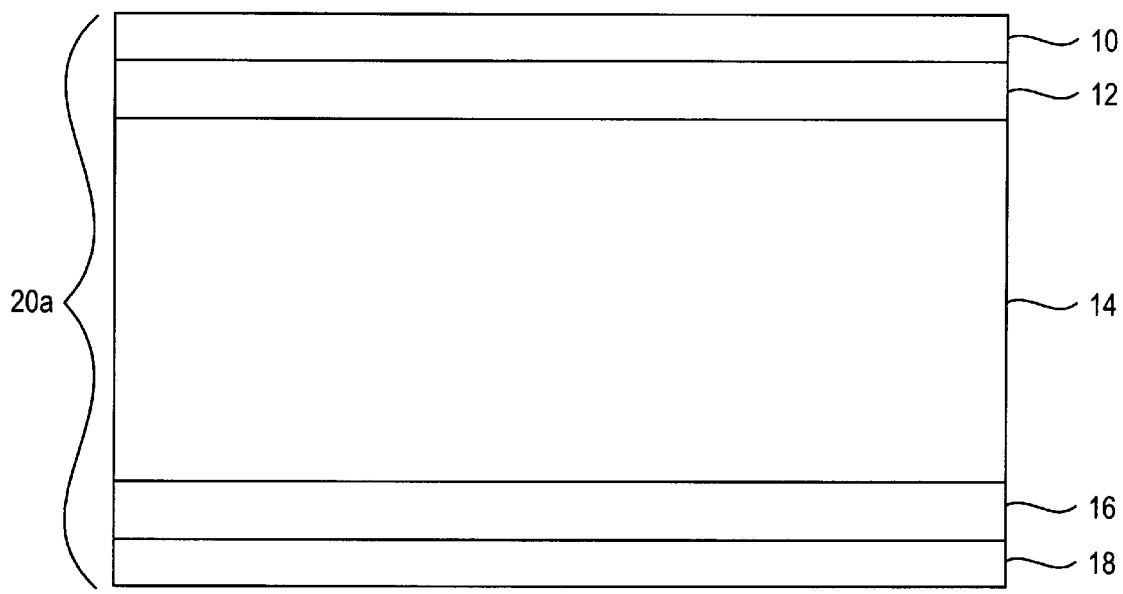
FIG. 1 is a side view of the foam condensation board system of one embodiment used in the present invention.

While the invention is susceptible to various modifications and alternative forms, a specific method of use thereof has been shown by way of example in the drawing and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

Foam Condensation Board System

According to one embodiment, a foam condensation board system 20 used in the present invention, as shown in FIG. 1, includes at least a first layer 10, a second layer 12, a third layer 14, a fourth layer 16, and a fifth layer 18. The first layer 10 of the foam condensation board system 20 a in FIG. 1 is located adjacent to the second layer 12. The second layer 12 is located between the first layer 10 and the third layer 14. The third layer 14 is located between the second layer 12 and the fourth layer 16 while the fourth layer 16 is located between the third layer 14 and the fifth layer 18.

Figure 2:
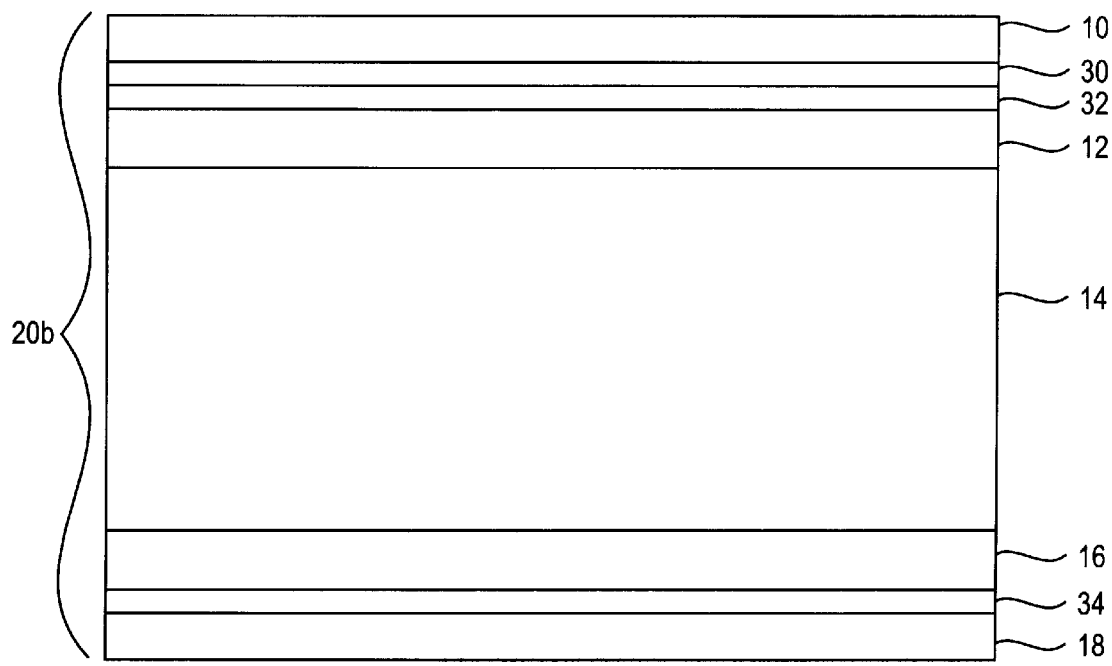
FIG. 2 is a side view of a foam condensation board system of a second embodiment used in the present invention.
Figure 3B:
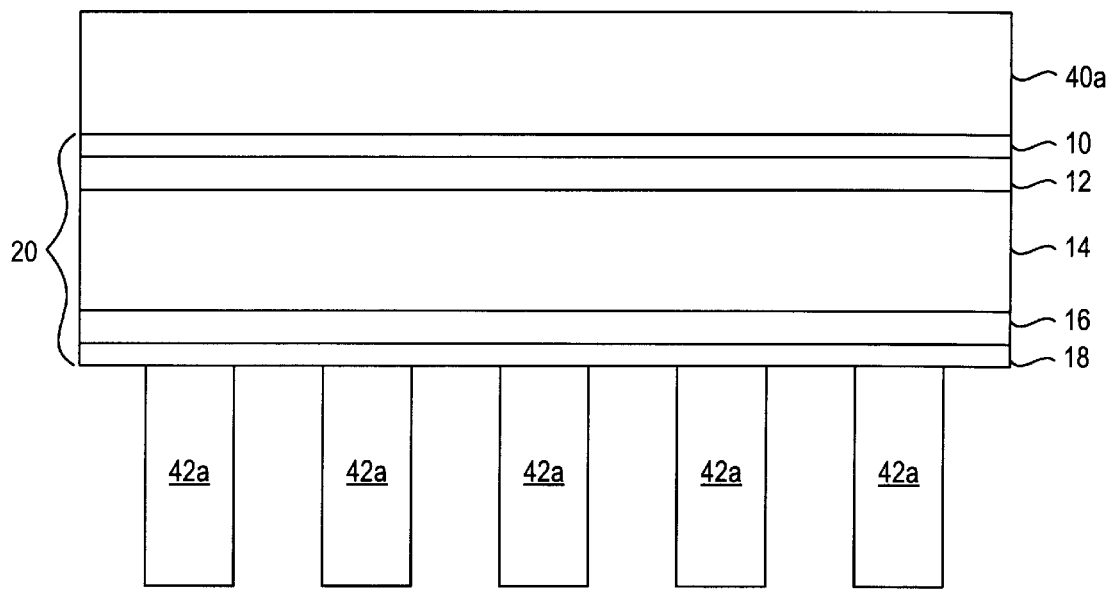
Figure 4B:
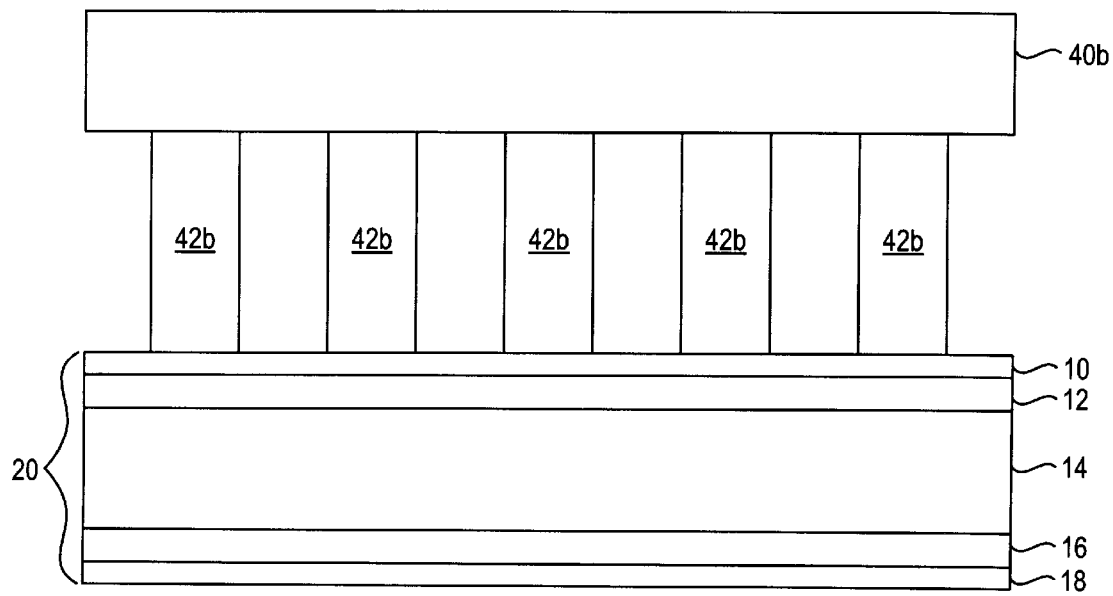
Figure 4A:
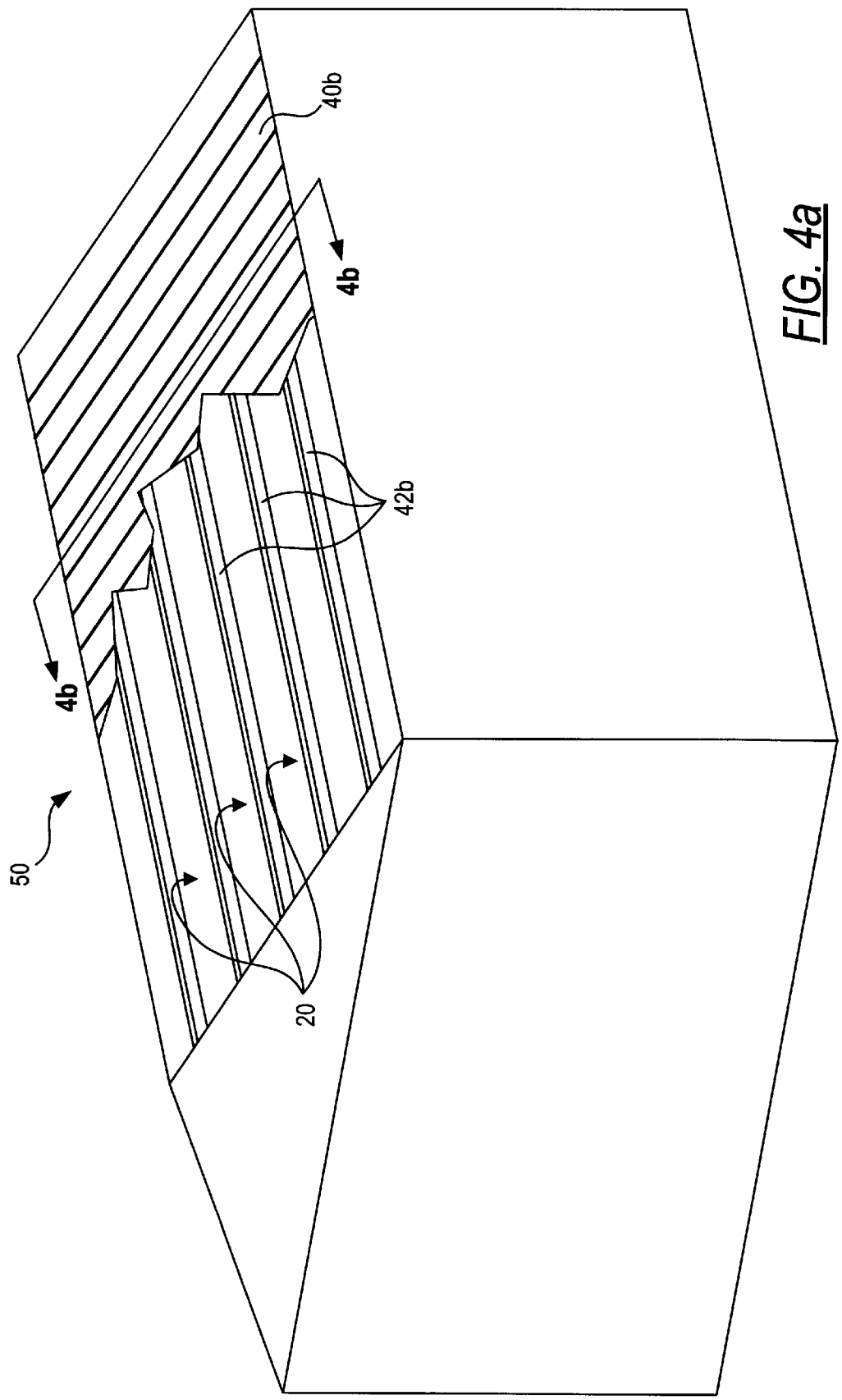
FIG. 4a is a perspective view of the foam condensation board system in the present invention according to a second method of use in a roofing application.
Figure 5B:
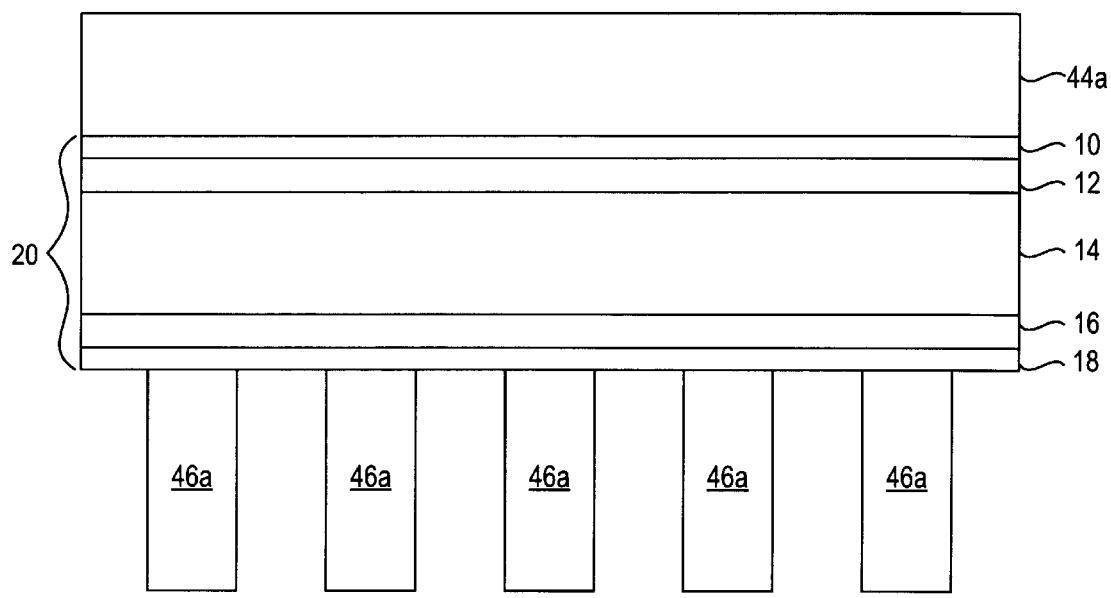
Figure 6B:
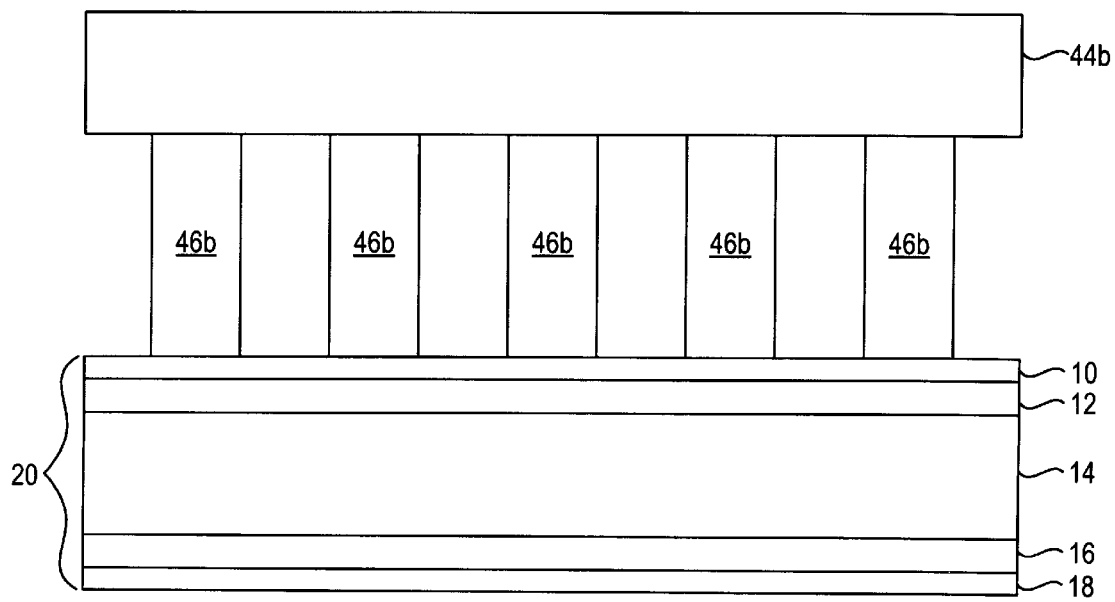
Figure 6A:
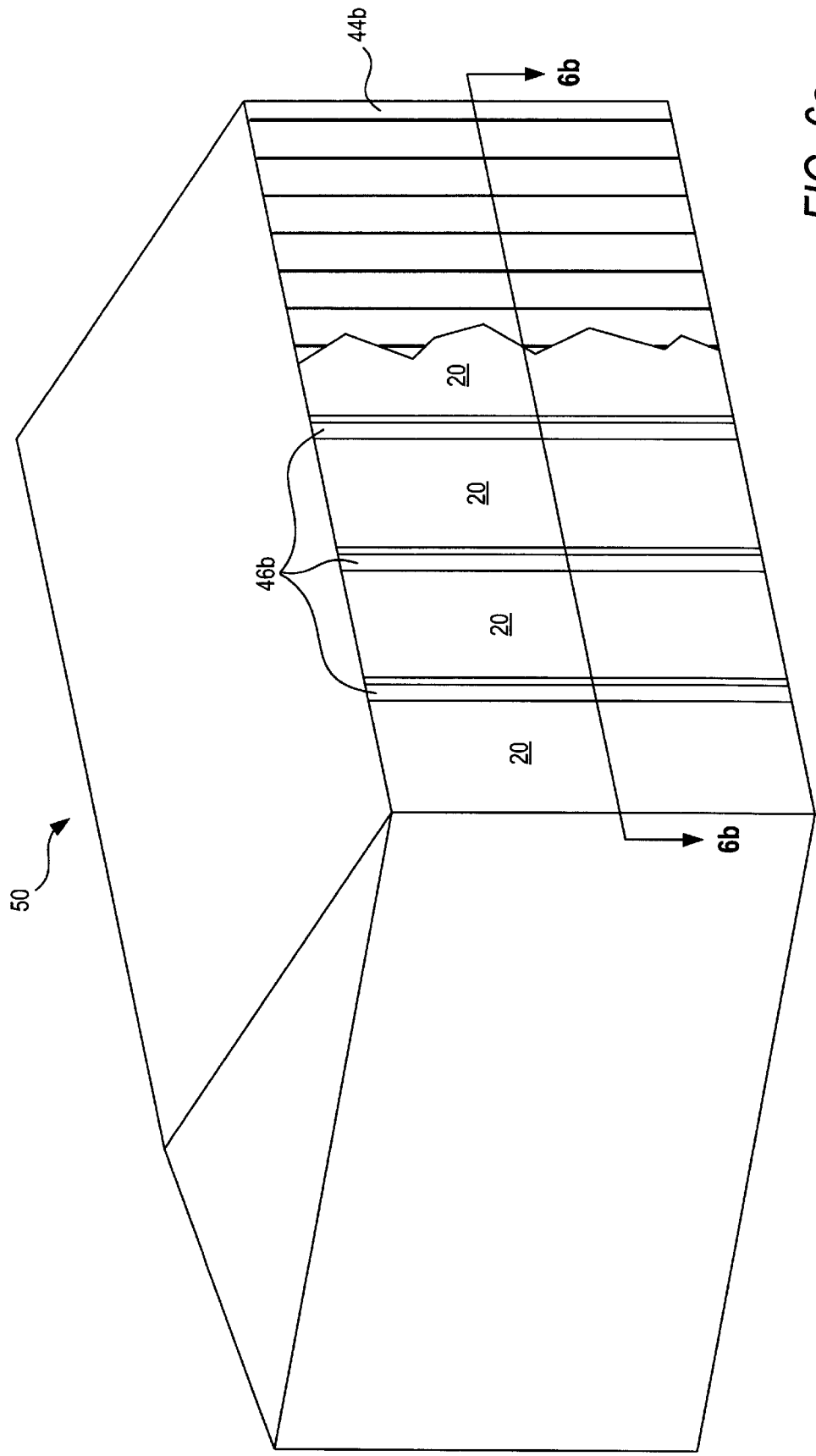
FIG. 6a is a perspective view of the foam condensation board system in the present invention according to a second method of use in a siding application.

It is contemplated that additional layers may be added to the foam condensation board system 20 to bond any of the adjacent layers together. For example, FIG. 2 shows an example of an alternative embodiment of a foam condensation board system 20b where a first adhesive layer 30 and a second adhesive layer 32 are located between the first layer 10 and the second layer 12 and a third adhesive layer 34 is located between the fourth layer 16 and the fifth layer 18.

It is also contemplated that the foam condensation board system 20 may contain optional laminated surface coatings or "facers". The laminated surface coating may be added to an outer surface of the first layer 10 and/or the fifth layer 18.

FIGS. 3–6 illustrate applications of the foam condensation board system 20 to the interior of a building, specifically to a roof 40, a roof supporting structure 42, a side wall 44, and a side wall supporting structure 46. As shown in FIGS. 3–6, the foam condensation board system 20 may be installed below a roof 40 or inside a side wall 44 of a building 50. According to one method of use, the foam condensation board system 20, as shown in FIGS. 3a and 3b, is installed between a roof 40a and a roof supporting structure 42a (i.e., to an interior surface of the roof 40a) of a building 50. According to an alternative method of use, the foam condensation board system 20, as shown in FIGS. 4a and 4b, is installed to a roof supporting structure 42b wherein the roof supporting structure 42b is directly installed to an interior surface of a roof 40b. According to another method of use, the foam condensation board system 20, as shown in FIGS. 5a and 5b, is installed between at least one side wall 44a and a side wall supporting structure 46a (i.e., to an interior surface of the side wall 44a) of a building 50. According to an alternative method of use, the foam condensation board system 20, as shown in FIGS. 6a and 6b, is installed to a side wall supporting structure 46b wherein the side wall supporting structure 46b is directly installed to an interior surface of a side wall 44b. The foam condensation board system 20 used according to the above methods withstands thermal expansions and contractions of the roof 40 and the side wall(s) 44 and assists in providing a generally moisture-free environment.

The foam condensation board system 20 is typically used in buildings having metal roofs and/or metal exterior walls, which are often low end structures. Low end structures using the foam condensation board system 20 include agricultural buildings.

First Layer

The first layer 10 of the foam condensation board system 20 may be formed from any of the following resins: alkenyl aromatic polymers, polyolefins, polyethylene terephthalate, polyesters, and combinations thereof.

The term "alkenyl aromatic polymer" as used herein includes polymers of aromatic hydrocarbon molecules that contain an aryl group joined to a olefinic group with only double bonds in the linear structure, such as styrene, °-methylstyrene, o-methylstyrene, m-methylstyrene, p-methylstyrene, x-ethylstyrene, α-vinylxylene, α-chlorostyrene, α-bromostyrene, vinyl toluene and the like. Alkenyl aromatic polymers also include homopolymers of styrene (commonly referred to as polystyrene or a polystyrenic resin) and also copolymers of styrene and butadiene (commonly referred to as impact polystyrene).

The term "polystyrenic resin" or "polystyrene" as used herein includes homopolymers of styrene, and styrene copolymers comprised of at least 50 mole percent of a styrene unit (preferably at least about 70 mole percent) and a minor (i.e., less than 50%) proportion of a monomer copolymerizable with styrene. The term "polystyrenic resin" or "polystyrene" as used herein also includes blends of at least 50 percent by weight of the styrene homopolymer (preferably at least about 60 weight percent) with another predominately styrenic copolymer. The physical blends are combined in a dry form after the blends have previously been polymerized.

The polystyrenic resin that can be used in the present invention can be any of those homopolymers obtained by polymerizing styrene to a weight average molecular weight ($M_w$) of from about 100,000 to about 450,000 (commonly referred to as crystal polystyrene) or can be any of those graft copolymers obtained by polymerizing a blend of polymerized styrene upon a nucleus of styrene-butadiene rubber (SBR) to a weight average molecular weight of from about 100,000 to about 350,000 (commonly referred to as impact polystyrene).

Impact polystyrenes are generally classified as medium impact polystyrene (MIPS), high impact polystyrene (HIPS), or super high impact polystyrene (S-HIPS). The butadiene level of the impact polystyrene is preferably in the range from about 3 to about 10 weight percent of the copolymer (butadiene and polystyrene). The impact polystyrene generally has a melt flow index of less than about 5 g/10 min., and preferably less than about 3 g/10 min.

The alkenyl aromatic polymer used in the present invention can be obtained by blending two or more alkenyl aromatic polymers. For example, blends of crystal polystyrene and impact polystyrenes, such as crystal polystyrene and HIPS, may be blended to comprise the alkenyl aromatic polymer used in the present invention.

The term "polyolefin" as used herein includes polypropylenes, polyethylenes, and polybutenes. The term "polypropylene" as used herein includes polymers of propylene or polymerizing propylene with other aliphatic polyolefins, such as ethylene, 1-butene, 1-pentene, 3-methyl-1-butene, 4-methyl-1-pentene, 4-methyl-1-hexene, 5-methyl-1-hexene and mixtures thereof. Polypropylene not only includes homopolymers of propylene, but also propylene copolymers comprised of at least 50 mole percent (preferably at least 70 mole percent) of a propylene unit and a minor proportion of a monomer copolymerizable with propylene and blends of at least 50 percent by weight of the propylene homopolymer with another polymer.

The term "polyethylene" as used herein includes polymers of ethylene, such as low density polyethylene (LDPE), medium density polyethylene (MDPE), high density polyethylene (HDPE), very low density polyethylene (VLDPE), linear low density polyethylene (LLDPE), metallocene-catalyzed linear low density polyethylene (mLLDPE) and combinations thereof.

LDPE is generally defined as an ethylenic polymer having a specific gravity of from about 910 to about 925 kg/m$^3$. MDPE is generally defined as an ethylenic polymer having a specific gravity between the LDPEs and the HDPEs (i.e., from about 925 to about 940 kg/m³). The term polyethylene as used herein includes homopolymers of ethylene and copolymers comprised of at least 50 mole percent of a ethylene unit (preferably at least 70 mole percent) and a minor (i.e., less than 50%) proportion of a monomer copolymerizable with the ethylene unit. The term LDPE as used herein also includes physical blends of two or more different homopolymers that are classified as LDPEs. Similarly, the term MDPE and HDPE may also include blends of two or more different homopolymers classified as MDPEs and HDPEs, respectively.

The HDPE used in the present invention has a specific gravity of from about 940 to about 970 kg/m³. The $M_z$ is generally greater than about 1,000,000 and preferably greater than about 1,200,000. The z-average molecular weight ($M_z$) is characterized by a concentration of extremely high molecular weight polymer chains (i.e., those near an upper end of the molecular weight distribution). The HDPE generally has a polydispersity index, $D=M_w/M_n$, in the range of from about 12 to about 20.

The VLDPE used in the present invention has a density ranging from about 880 to about 912 kg/m³, more commonly from about 890 to about 910 kg/M³, and melt indices of from about 0.5 to about 5 g/10 min., preferably from about 1 to about 3 g/10 min.

The LLDPE used in the present invention are preferably those having from about 1 to about 20, preferably from about 1 to about 10 weight percent of said higher alpha olefin monomer copolymerized therein. In addition, the alpha olefin monomer employed in the ethylenic copolymer may be selected from the group consisting of 1-butene, 3-methyl-1-butene, 3-methyl-1-pentene, 1-hexene, 4-methyl-1-pentene, 3-methyl-1-hexene, 1-octene and 1-decene. The LLDPE resins that can be used in the present invention have densities ranging from about 890 to about 940 kg/m³, more commonly from about 900 to about 930 kg/m³, and a melt index ($I_2$) of from about 1 to about 10 g/10 min. as determined by ASTM D1238.

The mLLDPE is a polymer having a low polydispersity. The low polydispersity polymer may be prepared from a partially crystalline polyethylene resin that is a polymer prepared with ethylene and at least one alpha olefin monomer, e.g., a copolymer or terpolymer. The alpha olefin monomer generally has from about 3 to about 12 carbon atoms, preferably from about 4 to about 10 carbon atoms, and more preferably from about 6 to about 8 carbon atoms. The alpha olefin comonomer content is generally below about 30 weight percent, preferably below about 20 weight percent, and more preferably from about 1 to about 15 weight percent. Exemplary comonomers include propylene, 1-butene, 1-pentene, 1-hexene, 3-methyl-1-pentene, 4-methyl-1-pentene, 1-octene, 1-decene, and 1-dodecene.

The low polydispersity polymer has a density of from about 880 to about 940 kg/m³. The polydispersity polymer should have a molecular weight distribution, or polydispersity, ($M_w/M_n$, "MWD") within the range of from about 1 to about 4, preferably from about 1.5 to about 4, more preferably from about 2 to about 4, and even more preferably from about 2 to about 3. The melt flow ratio (MFR) of these polymers, defined as $I_{20}/I_2$ and as determined in accordance to ASTM D1238, is generally from about 12 to about 22 and preferably from about 14 to about 20. The melt index (MI), defined as the $I_2$ value, should be in the range of from about 0.5 to about 10 g/10 min. and preferably from about 1 to about 5 g/10 min. as determined by ASTM D1238.

An example of a "polybutene" includes a polymer of isobutene. An example of a "polyethylene terephthalate" includes a polyester resin made from ethylene glycol and terephthalic acid. An example of a "polyester" includes a polyester resin which is a polycondensation product of a dicarboxylic acid with a dihydroxy alcohol.

The first layer 10 is generally from about 0.5 mils to about 2.0 mils in thickness, with the preferred thickness being from about 0.8 to about 1.6 mils. The first layer 10 is generally a film layer. It is contemplated, however, that the first layer 10 may be formed from a foam, foil, fabric, or paper. It is also contemplated that the first layer 10 may be metallized or nonmetallized, single or biaxially oriented, and noncolored or colored. The term "single oriented" as used herein indicates that the material is oriented primarily in a single direction. The term "biaxially oriented" as used herein indicates that the material is oriented in two directions.

According to the preferred embodiment, the first layer 10 of the foam condensation board system 20 is formed from a polyolefin. The preferred polyolefin for use in forming the first layer 10 is polypropylene. It is also preferred that the first layer 20 is a polyolefin film which is nonmetallized, single oriented, and colored white. The use of a white colored film in the first layer 10 aids in brightening the interior of a building. The white colored film in the first layer 10 generally has an ultimate tensile as measured by ASTM D-882 of greater than about 3700 psi and a percent elongation as measured by ASTM D-882 of greater than about 450%.

Second and Fourth Layers

The second layer 12 and the fourth layer 16 of the foam condensation board system 20 may be independently formed from any of the following resins: alkenyl aromatic polymers, polyolefins, polyethylene terephthalate, adhesives, and combinations thereof. It is not necessary that the second and fourth layers 12, 16 be formed from the same resins. It is contemplated that the resin used in the second and fourth layers 12, 16 may be coextruded. If an adhesive is used for the second layer 12 and/or the fourth layer 16, the remaining layers must be made thicker to provide the strength lost by the second layer 12 and/or the fourth layer 16.

As used herein, the term "adhesive" includes any material which is capable of chemically bonding one layer of the foam condensation board system 20 to another layer. Examples of suitable adhesives include ethylene vinyl acetate (EVA), a mixture of EVA in polyethylene, block copolymers comprising polymeric regions of styrene-rubber-styrene such as KRATON® made by SHELL® Chemical Company, and a modified EVA such as BYNEL® made by DuPONT®. Modified EVAs have melt indices from about 6.4 to about 25 g/10 min. as measured by ASTM D1238 and densities from about 923 to about 947 kg/m³ as measured by ASTM D1505.

The second and fourth layers 12, 16 are generally from about 1.2 to about 3.0 mils in thickness, with the preferred thickness being from about 1.5 to about 2.0 mils. According to the preferred embodiment, the second and fourth layers 12, 16 of the foam condensation board system 20 are formed by extruding an alkenyl aromatic polymer, such as a polystyrenic resin. Polystyrenic resins are generally preferred because they provide more stiffness to the foam condensation board system 20 than other materials such as polyethylene as measured by ASTM D1037-87 and ASTM D1621-73. Also, at the present time, polystyrenic resins are more economical to use than the other contemplated resins in forming the second and fourth layers 12, 16. The preferred polystyrenic resin is impact polystyrene.

Third Layer

The third layer 14 of the foam condensation board system 20 may be formed from any of the following resins: alkenyl aromatic polymers, polyethylene terephthalate, and combinations thereof. The third layer 14 is generally from about 180 to about 260 mils in thickness, with the preferred thickness being from about 210 to about 240 mils.

According to the preferred embodiment, the third layer 14 of the foam condensation board system 20 is formed by extrusion using an alkenyl aromatic polymer, such as a polystyrenic resin. Polystyrenic resins are generally preferred because they provide more stiffness to the foam condensation board system 20 than other materials such as polyethylene as measured by ASTM D1037-87 and ASTM D1621-73. Also, at the present time, polystyrenic resins are more economical to use than the other contemplated resins in forming the third layer 14. The preferred polystyrenic resin for use in the third layer 14 is a blend of impact polystyrene and crystal polystyrene. The blend of impact polystyrene and crystal polystyrene may include virgin and reprocessed material.

Fifth Layer

The fifth layer 18 of the foam condensation board system 20 may be formed from any of the following resins: alkenyl aromatic polymers, polyolefins, polyethylene terephthalate, polyesters, and combinations thereof. The fifth layer 18 is generally moisture resistant.

The fifth layer 18 is generally from about 0.5 mils to about 2.0 mils in thickness, with the preferred thickness being from about 0.6 to about 1.2 mils. The fifth layer 18 is generally a film layer. It is contemplated, however, that the fifth layer 18 be formed from a foam, foil, fabric, or paper. It is also contemplated that the fifth layer 18 may be metallized or nonmetallized, single or biaxially oriented, and clear or colored.

According to the preferred embodiment, the fifth layer 18 of the foam condensation board system 20 is formed from a polyolefin. The preferred polyolefin for use in forming the fifth layer 18 is polypropylene. It is also preferred that the fifth layer 18 is a polyolefin film which is nonmetallized, biaxially oriented, and clear.

The layers of the foam condensation board system 20 may be bonded by attaching, adhering, fusing, or the like. For example, the layers may be thermally bonded or chemically bonded to one another. Whether a layer is thermally or chemically bonded depends upon the selected resin(s) of one layer and that of the adjacent layer. Thermal bonding may be accomplished by any conventional manner to fuse the polymeric surfaces including the use of a flameless air torch, heated rolls and infrared heating.

Chemical bonding can be accomplished by using a chemical attaching means such as an adhesive. It is contemplated that an additional layer or layers may optionally be added to the foam condensation board system 20 between any of the adjacent layers to chemically bond adjacent layers. For example, an adhesive may be used between the first layer 10 and the second layer 12 to attach these layers. Likewise, an adhesive may be used between any of the remaining layers to attach the layers to one another (e.g., the third layer 14 to the fourth layer 16). It is contemplated that one or more additional layers may be made of an adhesive or any material having suitable bonding characteristics. It is also contemplated that the one or more adhesives which are optionally used to bond adjacent layers of the foam condensation board system 20 may be preattached to a layer, coextruded onto a layer, or applied via conventional adhesive bonding methods. The adhesive layers are generally from about 0.15 to about 0.5 mils in thickness and can vary depending upon the particular location of the adhesive layer in the foam condensation board system 20.

FIG. 2 depicts a second embodiment of the foam condensation board system 20b which includes an additional adhesive layer to bond the layers of the foam condensation board system 20b together. As shown in FIG. 2, a first adhesive layer 30 and a second adhesive layer 32 are used between the first layer 10 and the second layer 12 and a third adhesive layer 34 is used between the fourth layer 16 and the fifth layer 18. The second adhesive layer 32 may be coextruded onto the second layer 12 while the third adhesive layer 34 may be coextruded onto the fourth layer 16. The preferred adhesive of the first adhesive layer 30 is a mixture of EVA in polyethylene, with the preferred amount being at least 15% EVA in polyethylene. The preferred adhesives of the second and third adhesive layers 32, 34 are KRATON® or BYNEL®.

Properties of the Foam Condensation Board System

The foam condensation board system 20 used in the present invention comprises at least a first layer 10, a second layer 12, a third layer 14, a fourth layer 16, and a fifth layer 18. It is contemplated that additional first and fifth layers 10, 18 may be added to the foam condensation board system 20. It is contemplated that at least one layer of the foam condensation board system 20 is a foam layer.

The foam condensation board system 20 used in the present invention generally has a density as measured by ASTM D1622-88 from about 1.0 to about 6.0 lbs/ft$^3$ and preferably is from about 2.0 to about 5.0 lbs/ft$^3$. Generally, the density of the first and fifth layers 10, 18 is from about 54.0 to about 62.0 lbs/ft$^3$, the second and fourth layers 12, 16 is from about 61.0 lbs/ft$^3$ to about 69.0 lbs/ft$^3$, and the third layer 14 is from about 1.0 lbs/ft$^3$ to about 6.0 lbs/ft$^3$ and preferably is from about 1.5 to about 4.0 lbs/ft$^3$.

The foam condensation board system 20 used in the present invention prevents condensation and possesses enhanced strength and tear resistance without the need to make the foam board thicker in obtaining such enhanced properties. The foam condensation board system 20 used in the present invention exhibits good stiffness and strength in the machine direction as measured by ASTM D1037-87. The foam condensation board system 20 generally has a machine direction (MD) average flexural strength stress at yield as determined by ASTM D1037-87 of greater than about 200 psi. The MD average flexural strength stress at yield is preferably greater than about 225 psi, most preferably is greater than about 250 psi, and even more preferably greater than 275 psi. The foam condensation board system 20 generally has a transverse direction (TD) average flexural strength stress at yield as determined by ASTM D1037-87 of greater than about 130 psi. The TD average flexural strength stress at yield is preferably greater than about 150 psi, most preferably is greater than about 170 psi, and even more preferably greater than 190 psi.

The foam condensation board system 20 generally has an MD average load at yield as determined by ASTM D1037-87 greater than about 2.5 lbs. The MD average load at yield is preferably greater than about 2.75 lbs, more preferably is greater than about 3.0 lbs, and most preferably is greater than about 3.25 lbs. The foam condensation board system 20 generally has a TD average load at yield as determined by ASTM D1037-87 greater than about 1.5 lbs. The TD average load at yield is preferably greater than about 1.75 lbs, more preferably is greater than about 2.0 lbs, and most preferably is greater than about 2.25 lbs.

The foam condensation board system 20 generally has a MD average compressive strength at 10% as determined by ASTM D1621-73 greater than about 17 psi. The MD average compressive strength at 10% is preferably greater than about 18 psi and most preferably is greater than about 19 psi.

The foam condensation board system 20 generally has a water vapor transmission rate (WVTR) of 0.5 as determined by ASTM E96 (Procedure A). For a condensation board to be effective in dealing with condensation, it must have a WVTR of less than 1.0 as determined by ASTM E96 (Procedure A).

The foam condensation board system 20 used in the present application may be formed into a number of shapes. For example, the foam condensation board system 20 may be a flat board sheet or a folded or hinged board (typically referred to as a fanfold board). The fanfold board is designed to unfold at its hinges and includes a number of individuals panels. The preferred shape is a fanfold board because it possesses fewer seams to be taped when hanging the material, resulting in labor savings.

The foam condensation board system 20 used in the present invention may be manufactured in a variety of sizes. Popular sizes used in the housing market include a 4 foot by 8 foot flat board sheet (4'×8') or a 4 foot by 50 foot fanfold board (4'×50') which includes a number of individual panels for easy installation and labor savings.

The foam condensation board system 20 may also vary in thickness. Generally, the thickness of the foam condensation board system 20 is from about ⅛" to about ½" as measured by ASTM D1622-88. The thickness of the foam condensation board system 20 is typically from about ⅛" to about ⅜", with a thickness of ¼" being preferred.

The layers of the foam condensation board system 20 may also vary in their respective weight percent relative to each other. The foam condensation board system 20 generally comprises from about 50 wt. % to about 90 wt. % of the third layer 14. The remainder of the foam condensation board system 20 (10 wt. % to about 50 wt. %) comprises the first layer 10, the second layer 12, the fourth layer 16, and the fifth layer 18. It is contemplated that the remainder of the foam condensation board system 20 can include other materials including, but not limited to, adhesives. Preferably, the foam condensation board system 20 comprises from about 60 to about 85 wt. % of the third layer 14 and most preferably from about 65 wt. % to about 75 wt. % of the third layer 14. In general, the third layer 14 is preferably increased on a percentage basis when the thickness of the foam condensation board system 20 is increased because of economic considerations.

The foam board condensation system 20 can be used in a variety of applications. It is contemplated that the foam condensation board system 20 may be installed to the roof 40, the roof supporting structure 42, the side wall 44, or the side wall supporting structure 46. As used herein, the term "roof supporting structure" includes a beam, rafter, truss, purlin, or joist. As used herein, the term "side wall supporting structure" includes a girt, stud, or post.

The foam condensation board system 20 is preferably installed so that the first layer 10 faces the interior of the building 50. By this order of application, the first layer 10, which is typically colored, aids in brightening the interior of the building, and the generally moisture resistant fifth layer 18 assists in preventing water from is leaking through the board and onto the materials stored inside the building.

EXAMPLE

Tests were conducted to compare the use of the foam condensation board system 20 with other layered structures, with the results being shown in Table 1. The samples used were (A) Foam Condensation System Board 1; (B) Comparative Board 2; (C) Comparative Board 3; and (D) Comparative Board 4.

Foam Condensation System Board 1 was a ¼" multi-layered fanfolded and nonperforated board comprising a first layer 10, a second layer 12, a third layer 14, a fourth layer 16, and a fifth layer 18 having additional adhesive layers. The first layer 10 was made from a white polypropylene film (1.6 g/100 in$^2$) which was coextruded with an adhesive layer. The second layer 12 was made from high impact polystyrene (3.3 g/100 in$^2$). A BYNEL® adhesive layer was added adjacent the second layer 12 between the second layer 12 and the first layer 10 (0.35 g/100 in$^2$). The third layer 14 was made from extruded polystyrene (14 g/100 in$^2$). The fourth layer 16 was made from high impact polystyrene (3.3 g/100 in$^2$). A BYNEL® adhesive layer was added adjacent the fourth layer 16 between the fourth layer 16 and the fifth layer 18 (0.35 g/100 in$^2$). The fifth layer 18 was made from a clear polypropylene film (0.95 g/100 in$^2$).

Comparative Board 2 was a ¼" three-layered board having a polystyrene foam core layer located between two layers of high impact polystyrene. The polystyrene foam core was extruded and no adhesive layers were used. Comparative Board 2 was fanfolded and perforated.

Comparative Board 3 was a ¼" three-layered board having a polystyrene foam core layer located between two layers of high impact polystyrene. The polystyrene foam core was extruded and no adhesive layers were used. Comparative Board 3 was fanfolded and nonperforated.

Comparative Board 4 was a ⅜" three-layered board having a polystyrene foam core layer located between two layers of high impact polystyrene. The polystyrene foam core was extruded and no adhesive layers were used. Comparative Board 4 was fanfolded and nonperforated.

TABLE 1

| Physical Characteristics | ASTM Test Number | Foam Condensation Board System 1 | Comparative Board 2 | Comparative Board 3 | Comparative Board 4 |
|---|---|---|---|---|---|
| average density (lb/ft$^3$) | ASTM D1238 | 3.93 | 3.4–4.1 | 3.4–4.2 | 3.2–3.9 |
| average compressive strength (psi at 10% deflection) | ASTM D1621-73 | 20.6 | 12 | 16 | 12 |
| average MD flexural strength stress at yield (psi) | ASTM D1037-87 | 282.1 | 185 | 198 | 120 |
| average TD flexural strength stress at yield (psi) | ASTM D1037-87 | 195.5 | 149 | 160 | 170 |
| MD load at yield (lbs) | ASTM D1037-87 | 3.37 | 2.4 | 2.6 | 3.5 |
| TD load at yield (lbs) | ASTM D1037-87 | 2.26 | 1.9 | 1.6 | 4.5 |
| MD displacement at yield (inches) | ASTM D1037-87 | 0.461 | 0.55 | 0.51 | 0.55 |
| TD displacement at yield (inches) | ASTM D1037-87 | 0.510 | 0.37 | 0.42 | 0.72 |
| bromine content (%) | none | 0.93 | > or = 0.9 | > or = 0.9 | > or = 1.35 |
| WVTR (perm) | ASTM E96 (Procedure A) | 0.5 | 1.8 | 0.6 | 0.6 |

Referring to Table 1, Foam Condensation Board System 1 was significantly stronger and possessed significantly enhanced tear resistance in comparison to the Comparative Boards 2–4 as shown by the average compressive strength and the flexural strength stress at yield as measured by ASTM D1037-87. Specifically, Foam Condensation Board System 1 had an average machine direction flexural strength stress at yield that was significantly higher than Comparative Boards 2–4. Furthermore, Foam Condensation Board System 1 had an average transverse direction flexural strength stress at yield as determined by ASTM D1037-87 that was greater than Comparative Boards 2–4.

While the present invention has been described with reference to one or more particular embodiments, those skilled in the art will recognize that many changes may be made thereto without departing from the spirit and scope used in the present invention. Each of these embodiments and obvious variations thereof is contemplated as falling within the spirit and scope of the claimed invention, which is set forth in the following claims.

What is claimed is:

1. A method for using a foam condensation board system in a building, said method comprising the steps of:

providing a foam condensation board system, said foam condensation board system comprising at least a first layer, a second layer, a third layer, a fourth layer, and a fifth layer, said first layer is made from a material selected from the group consisting of alkenyl aromatic polymers, polyolefins, polyethylene terephthalate, polyesters, and combinations thereof, said second and fourth layers are independently made from a material selected from the group consisting of alkenyl aromatic polymers, polyolefins, polyethylene terephthalate, adhesives, and combinations thereof, said third layer is made from a material selected from the group consisting of alkenyl aromatic polymers, polyethylene terephthalate, and combinations thereof, said fifth layer is made from a material selected from the group consisting of alkenyl aromatic polymers, polyolefins, polyethylene terephthalate, polyesters, and combinations thereof, at least one layer selected from the group consisting of the first layer, the second layer, the third layer, the fourth layer, and the fifth layer being a foam layer, said first layer being located adjacent said second layer, said second layer being located between said first layer and said third layer, said third layer being located between said second layer and said fourth layer, and said fourth layer being located between said third layer and said fifth layer;

providing said building, said building including a roof and a roof supporting structure; and installing said foam condensation board system to said roof supporting structure.

2. The method of claim 1, wherein said first layer is made from polyolefin, said polyolefin of said first layer is polypropylene, said second layer is made from an alkenyl aromatic polymer, said alkenyl aromatic polymer of said second layer is impact polystyrene, said third layer is made from an alkenyl aromatic polymer, said alkenyl aromatic polymer of said third layer is a blend of impact polystyrene and crystal polystyrene, said fourth layer is made from an alkenyl aromatic polymer, said alkenyl aromatic polymer of said fourth layer is impact polystyrene, and said fifth layer is made from polyolefin, said polyolefin of said fifth layer is polypropylene.

3. The method of claim 1, wherein said first layer and said fifth layer are made from a polyolefin, said polyolefin is polypropylene.

4. The method of claim 1, wherein said second layer and said fourth layer are made from an alkenyl aromatic polymer, said alkenyl aromatic polymer is a polystyrenic resin.

5. The method of claim 1, wherein said third layer is made from an alkenyl aromatic polymer, said alkenyl aromatic polymer is a polystyrenic resin.

6. The method of claim 3, wherein said polyolefin of said first layer is single oriented and colored white, said first layer facing an interior surface of said building.

7. The method of claim 3, wherein said polyolefin of said fifth layer is single oriented and clear.

8. The method of claim 3, wherein said polyolefin of said fifth layer is metallized.

9. The method of claim 1, wherein said foam condensation board system further comprises an additional layer, said additional layer being an adhesive layer.

10. The method of claim 9, wherein said adhesive layer is made from a material selected from the group consisting of ethylene vinyl acetate, a mixture of ethylene vinyl acetate in polyethylene, modified ethylene vinyl acetate, and block copolymers.

11. The method of claim 1, wherein said foam condensation board system is fanfolded.

12. The method of claim 1, wherein said foam condensation board system is a flat sheet.

13. The method of claim 1, further comprising the step of installing said foam condensation board system to an interior surface of said roof.

14. The method of claim 1, further comprising the step of installing a surface of said roof supporting structure directly to said interior surface of said roof.

15. The method of claim 1, wherein the roof supporting structure is selected from the group consisting of a beam, rafter, truss, purlin and joist.

16. The method of claim 1, wherein the foam condensation board system has a thickness from about ⅛ to about ½ inches.

17. A method for using a foam condensation board system in a building, said method comprising the steps of:

providing a foam condensation board system, said foam condensation board system comprising at least a first layer, a second layer, a third layer, a fourth layer, and a fifth layer, said first layer is made from a material selected from the group consisting of alkenyl aromatic polymers, polyolefins, polyethylene terephthalate, polyesters, and combinations thereof, said second and fourth layers are independently made from a material selected from the group consisting of alkenyl aromatic polymers, polyolefins, polyethylene terephthalate, adhesives, and combinations thereof, said third layer is made from a material selected from the group consisting of alkenyl aromatic polymers, polyethylene terephthalate, and combinations thereof, said fifth layer is made from a material selected from the group consisting of alkenyl aromatic polymers, polyolefins, polyethylene terephthalate, polyesters, and combinations thereof, at least one layer selected from the group consisting of the first layer, the second layer, the third layer, the fourth layer, and the fifth layer being a foam layer, said first layer being located adjacent said second layer, said second layer being located between said first layer and said third layer, said third layer being located between said second layer and said fourth layer, and said fourth layer being located between said third layer and said fifth layer, providing said building, said building having a side wall and a side wall supporting structure; and installing said foam condensation board system to said side wall supporting structure.

18. The method of claim 17, wherein said first layer is made from polyolefin, said polyolefin of said first layer is polypropylene, said second layer is made from an alkenyl aromatic polymer, said alkenyl aromatic polymer of said second layer is impact polystyrene, said third layer is made from an alkenyl aromatic polymer, said alkenyl aromatic polymer of said third layer is a blend of impact polystyrene and crystal polystyrene, said fourth layer is made from an alkenyl aromatic polymer, said alkenyl aromatic polymer of said fourth layer is impact polystyrene, and said fifth layer is made from polyolefin, said polyolefin of said fifth layer is polypropylene.

19. The method of claim 17, wherein said first layer and said fifth layer are made from a polyolefin, said polyolefin is polypropylene.

20. The method of claim 17, wherein said second layer and said fourth layer are made from an alkenyl aromatic polymer, said alkenyl aromatic polymer is a polystyrenic resin.

21. The method of claim 17, wherein said third layer are made from an alkenyl aromatic polymer, said alkenyl aromatic polymer is a polystyrenic resin.

22. The method of claim 19, wherein said polyolefin of said first layer is single oriented and colored white, said first layer facing an interior surface of said building.

23. The method of claim 19, wherein said polyolefin of said fifth layer is single oriented and clear.

24. The method of claim 19, wherein said polyolefin of said fifth layer is metallized.

25. The method of claim 17, wherein said foam condensation board system further comprises an additional layer, said additional layer being an adhesive layer.

26. The method of claim 25, wherein said adhesive layer is made from a material selected from the group consisting of ethylene vinyl acetate, a mixture of ethylene vinyl acetate in polyethylene, modified ethylene vinyl acetate, and block copolymers.

27. The method of claim 17, wherein said foam condensation board system is fanfolded.

28. The method of claim 17, wherein said foam condensation board system is a flat sheet.

29. The method of claim 17, further comprising the step of installing said foam condensation board system to an interior surface of said side wall.

30. The method of claim 17, further comprising the step of installing a surface of said side wall supporting structure directly to said interior surface of said side wall.

31. The method of claim 17, wherein the side wall supporting structure is selected from the group consisting of a girt, stud, and post.

32. The method of claim 17, wherein said foam condensation board system has a thickness from about 1/8 to about 1/2 inches.

* * * * *